United States Patent [19]

Wiberger et al.

[11] 4,416,332

[45] * Nov. 22, 1983

[54] METHOD FOR INCREASING THE PRESSURE IN OIL-BEARING GEOLOGICAL STRUCTURES

[75] Inventors: Lars I. Wiberger, Skara; Peter H. Ronnon, Mälnlycke, Sweden; Per F. Tengblad, Uppsala, Sweden; Bert G. H. Hellman, Akersberga, Sweden.

[73] Assignee: Chemical Dynamics Sweden AB, Grabo, Sweden

[*] Notice: The portion of the term of this patent subsequent to Nov. 17, 1998 has been disclaimed.

[21] Appl. No.: 269,993

[22] Filed: Jun. 3, 1981

Related U.S. Application Data

[63] Continuation of Ser. No. 85,713, Oct. 17, 1979, Pat. No. 4,300,632.

[30] Foreign Application Priority Data

Oct. 26, 1978 [SE] Sweden .............................. 78111118

[51] Int. Cl.³ .......................................... E21B 43/22
[52] U.S. Cl. .................. 166/246; 166/305 R
[58] Field of Search .............................. 166/246, 305 R

[56] References Cited

U.S. PATENT DOCUMENTS 3,185,216  5/1965  Hitzman .............................. 166/246
3,335,798  8/1967  Querio et al. ....................... 166/246

FOREIGN PATENT DOCUMENTS

WO79/00201  4/1979  World Intel. Prop. Org. .... 166/246

Primary Examiner—Stephen J. Novosad
Attorney, Agent, or Firm—Hane, Roberts, Spiecens & Cohen

[57] ABSTRACT

A method for increasing pressure in geological oil-bearing structures by gas production due to microbial activity comprising adding to a geological oil-bearing structure, a methane producing aneorobic micro-organism, a culture medium and formic acid. The formic acid is converted to carbon dioxide and methane gases resulting in increased pressure in the structures.

4 Claims, 1 Drawing Figure

ACCUMULATED CHANGE OF VOLUME AS FUNCTION OF TIME AT 20 atm AND + 70°C.

ACCUMULATED CHANGE OF VOLUME AS FUNCTION OF TIME AT 20 atm AND + 70°C.

METHOD FOR INCREASING THE PRESSURE IN OIL-BEARING GEOLOGICAL STRUCTURES

This is a continuation of application Ser. No. 85,713, filed Oct. 17, 1979, now U.S. Pat. No. 4,300,632.

FIELD OF THE INVENTION

The present invention relates to a method for increasing the pressure in an oil-bearing geological structure by means of microbial gas-production.

1. Prior Art

The largest known oil-reserve today is remaining oil in spent oil-wells. According to official statistics an average 60% of the oil can not be extracted from wells with present techniques. Today the methods used for enhanced oil-recovery are subdivided into three groups:

1 Primary method; depending on the geological structure in the oil-bearing structure, the viscosity of the oil, gas-pressure and the like, it is possible to recover from 5% to 70% of the oil in the well by self-pressure or pumping.

2 Secondary method; consists of different methods to increase pressures by gas-injection, water-flooding and the like. These techniques are quite energy-demanding.

3 Tertiary method; consists of a number of different methods, for example, the use of different polymers, even biopolymers to regulate surface tension, inner friction and the like.

Methods of increasing the pressure of carbon dioxide in the well has been tested. So called firefront-burning has been used on a large scale and even gas production by microbial activity has been evaluated.

2. Summary of the Invention

Modern anaerobic microbial research shows that it is possible to convert formic acid to methane even at quite a high temperature (60°–70° C.) The temperature in normal oil-wells in an average of 50°–100° C. and thus this type of fermentation could be well-suited for gas-production in oil-wells.

Our tests have shown that the microorganism Methanobacterium Termoautotroficum can grow on a substrate with the following composition, the concentrations being given per liter of water:

| NaCl | 0.6 g/l | buffered |
|---|---|---|
| Na$_2$CO$_3$ | 4 g/l | reduced |
| Na$_2$S | 0.5 g/l | |
| (NH$_4$)$_2$SO$_4$ | 0.3 g/l | |
| KH$_2$PO$_4$ | 0.3 g/l | |
| K$_2$HPO$_4$ | 0.15 g/l | |
| MgSO$_4$ | 0.006 g/l | |
| CaCl(2H$_2$O) | 0.006 g/l | |
| MnSO$_4$(1H$_2$O) | 0.005 g/l | |
| FeSO$_4$ | 0.001 g/l | |
| CoCl$_2$ | 0.001 g/l | |
| ZnSO$_4$ | 0.001 g/l | |
| CuSO$_4$ | 0.1 mg/l | |
| AlK(SO$_4$) | 0.1 mg/l | |
| H$_3$BO$_3$ | 0.1 mg/l | |
| Na$_2$MoO$_4$ | 0.1 mg/l | |
| NTA | 0.15 g/l | |
| Tween 80 | 0.02 ml/l | |

The gas produced by the substrate will be CO$_2$ and H$_2$, and the pH should be between 7.0 and 7.6.

The composition of sea-water with approximately 3.5% salinity is the following:

| NaCl | 28.0 g/l |
|---|---|
| MgCl$_2$ | 3.8 g/l |
| MgSO$_4$ | 1.75 g/l |
| CaSO$_4$ | 1.28 g/l |
| K$_2$SO$_4$ | 0.82 g/l |
| CaCO$_3$ | 0.12 g/l |
| KB | 0.10 g/l |
| SrSO$_4$ | 0.028 g/l |
| H$_3$BO$_3$ | 0.029 g/l |
| Cu$^{++}$ | 0.003 mg/l |
| Mn$^{++}$ | 0.002 mg/l |
| Co$^{++}$ | 0.0005 mg/l |
| Zn$^{++}$ | 0.001 mg/l |
| Fe$^+$ | 0.01 mg/l |

An undefined and cheaper substrate can thus be produced by diluting sea-water where the NaCl content will determine the degree of dilution. Normally a 1:10 dilution of sea-water is suitable. For the dilution, normal fresh-water could be used, Nitrogen will be added, as (NH$_4$)$_2$SO$_4$ so that the concentration of ammonium sulfate will be around 0.3 g/l. Potassium phosphate should be added to the substrate so that the concentration of KH$_2$PO$_4$ will be around 0.3 g/l and K$_2$HPO$_4$ will be around 0.2 g/l. As a carbon source and a substrate for gas-production, formic acid is added.

The taxomony for a methane production organism is still very inaccurate and thus very few other organisms capable of methane production under high temperatures are known. However, there is much technical information concerning methane gas production by microorganisms although these traditionally work with unidentified mixed cultures obtained from cattle-manure or municipal sludge. The above mentioned organism Methanobacterium Termoautotroficum is also obtained from a mixed culture of municipal sludge.

In the present invention, there is also considered the possibility of using an unidentified inoculum from a methane-gas process based on manure or municipal sludge. There is an advantage in using an inoculum of this type, because at the same time that the media is innoculated, trace-elements and vitamins are added which in a defined stage would be very expensive to add.

Methaneobacterium Termoautotroficum can not split formic acid into CO$_2$ and H$_2$ but it can produce methane from these two gases. By inoculating the described substrate based on sea-water with mixed cultures from manure, the substrate will also be innoculated with an organism which can split or hydrolyze formic-acid. The formic acid can be added as the Na- or Ca-salt so that the concentration of formate will not exceed 2 g/l.

The production of methane gas in a substrate which is not sufficiently buffered will lead to increased pH values. This can be adjusted by titration with an organic acid. As long as this acid is not metabolized it will have a pH-decreasing effect. When the breakdown of formic acid leads to methane production it will raise the pH. Through this double effect on the formic acid is, in this case, a very desirable substance to be used for titration. The production of methane gas will take place according to the following formula:

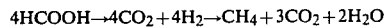

$$4HCOOH \rightarrow 4CO_2 + 4H_2 \rightarrow CH_4 + 3CO_2 + 2H_2O$$

According to the gas-law pV=nRT, 12 g of added formic acid will give a methane gas volume of 150 l at 1 atm and +60° C. The produced amount of CO$_2$ will be liquid under very high pressure which is why there is only the volume increase in pressure.

For practical use of microbial gas-production for increasing the pressure in oil wells, formic acid and mineral salts are added to the culture. By changing the velocity of the formic acid supply, it is possible to regulate gas production so that the pressure in the oil well can be continually regulated.

According to recent research reports, temperature and pressure from the biological point of view are inverse functions. Thus even temperatures which are considerably higher than the temperature optimum for the organism could be used (+70° C.) in this application.

DESCRIPTION OF PREFERRED EMBODIMENTS

Example 1

Figure 1:
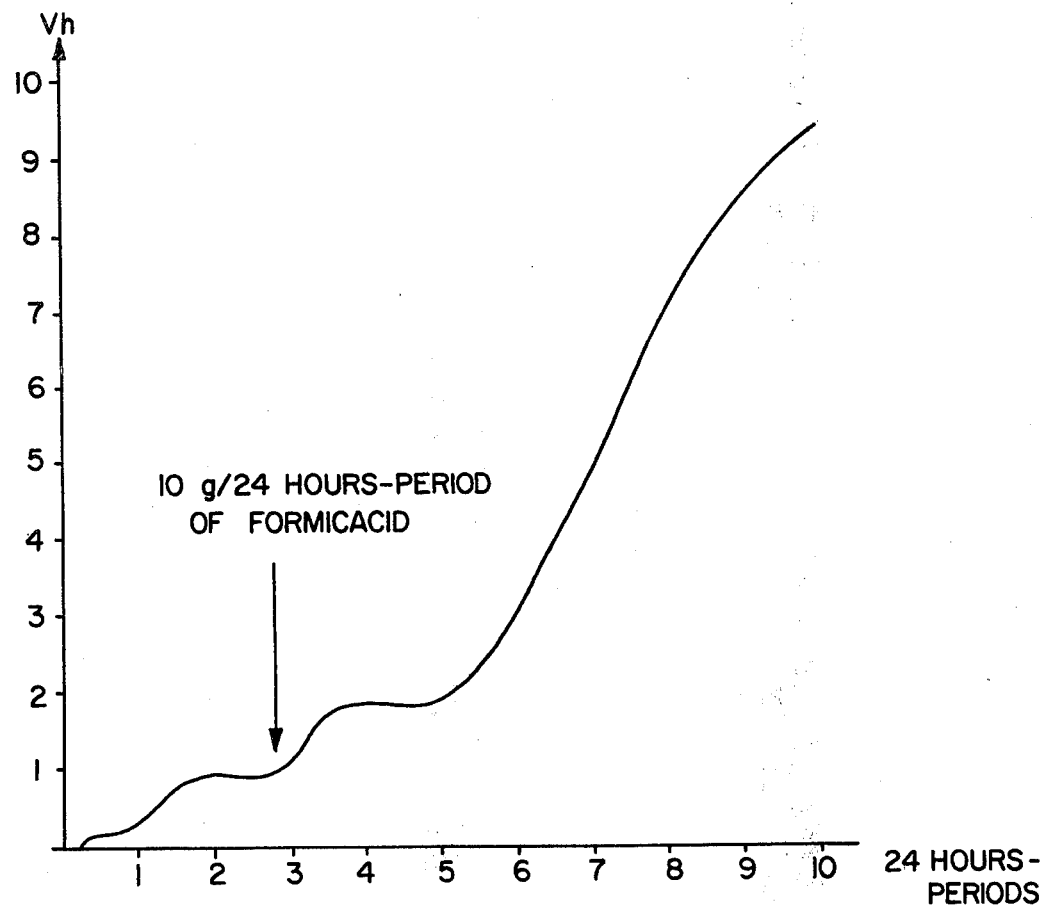
FIG. 1, the sole FIGURE in the drawing, is a graphical representation of accumulated volume of gas produced with respect to time according to the method of the invention.

A medium consisting of sea-water is diluted to a ratio of 1:10 with tap-water and completed with 0.3 g/l of $(NH_4)_2SO_4$, 0.3 g/l $KH_2PO_4$, 0.2 g/l $K_2HPO_4$ and 2 g/l Ca-formate.

The pH is adjusted to 7.2 with $Ca(OH)_2$. The resulting substrate is inoculated with an active micro-organism from 1% processed manure such as Methanobacterium Termoautotroficum and placed in a pressure-vessel with a volume of 1 l. The pressure-vessel could be stirred by a propeller. The pressure was gradually increased to 20 atm with the use of Ar and was kept at that pressure at a constant temperature of +70° C. The pressure was regulated by letting-out produced gas. The gas-volume produced was measured at +70° C. as a function of time.

The pH was kept constant by adding formic acid. Measuring the pH could not be carried out inside the vessel but was carried out in sample-volumes outside the vessels and new medium was supplied to the vessel to compensate for the loss of the test volumes.

For the first 24 hour-period, gas-production started very slowly but the second 24 hour-period showed very rapid gas-production. According to gas-analyses, the formed gas contained very small amounts of methane gas and mostly $H_2$. This is interpreted as a microbial splitting of formic acid into $CO_2$ and $H_2$ without having any following methane synthesis. When separate addition of formic acid was started still, mostly $H_2$ was still recorded as the gas complement but the formation of methane also started and was stabilized so that the increasing volume was 1.5:1/24 hour-period, which corresponds to an addition of roughly 2 g formic acid during the corresponding period. That the increasing volume during the first stage of the process is larger than that calculated probably depends on the formation of $H_2$. If the added formic acid should be divided into $CO_2$ and $H_2$, the increasing volume should be 5.94:1 per 24 hour-period ($CO_2$ under a pressure of 20 atm is not a gas).

EXAMPLE 2

The same substrate and culture-equipment which was used in Example 1 is now used for an experiment where the cultivation temperature was increased to +100° C. The increase in volume was, before temperature increase, 1.4:1 per 24 hour-period of gas under a pressure of 20 atm. The addition of formic acid was 10 g formic acid per 24 hour-period. When the temperature was increased from +70° C. to +100° C., the produced volume increased from 1.4:1 per 24 hour-period to 3.6:1. The gas-analyses showed that the major part of this increase was due to the increased partial pressure of hydrogen. After 96 hours, the increase in volume stabilized to 2.3:1 per 24 hour-period.

The temperature-increase will obviously stimulate those organisms which hydrolyze formic acid, however, organisms producing methane will not grow that fast.

The pH was varied between 6.4 and 7.8 during this test.

EXAMPLE 3

The same equipment and methods as in Example 1 were started at +35° C. The gas production in this experiment was slower and after 18 days a production of formic acid could be increased to 10 g per 24-hour period. Very small amounts of hydrogen were produced during this test.

In FIG. 1 is seen the accumulated change in volume with respect to time for the conditions in which 10 g per 24 hours of formic acid was added at a pressure of 20 atm and a temperature of 70° C.

What is claimed is:

1. A method for increasing pressure in geological oil-bearing structures by gas production due to microbial activity, said method comprising adding to a geological oil-bearing structure a methane producing aneorobic micro-organism, a culture medium and formic acid such that the formic acid is converted to carbon dioxide and methane gases resulting in increased pressure in said structure.

2. A method as claimed in claim 1 further comprising adding additional formic acid during cultivation to maintain the pH at between 7 and 8.

3. A method as claimed in claim 2 wherein the cultivation and gas production take place in said structure at 35°–100° C. and a pressure of at least 20 atm.

4. A method as claimed in claim 1 comprising regulating the velocity of introduction of formic acid to control the pressure in said structure.

* * * * *